(12) United States Patent
Li et al.

(10) Patent No.: US 10,856,229 B2
(45) Date of Patent: Dec. 1, 2020

(54) APPARATUS AND METHOD FOR WAKE-UP RADIO TRANSMISSION MODES

(71) Applicant: Apple Inc., Cupertino, CA (US)

(72) Inventors: Guoqing Li, Campbell, CA (US); Yong Liu, Campbell, CA (US); Christiaan A. Hartman, San Jose, CA (US); Jarkko L. Kneckt, Los Gatos, CA (US); Oren Shani, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/024,536

(22) Filed: Jun. 29, 2018

(65) Prior Publication Data

US 2019/0069239 A1  Feb. 28, 2019

Related U.S. Application Data

(60) Provisional application No. 62/553,074, filed on Aug. 31, 2017.

(51) Int. Cl.
*H04W 52/02* (2009.01)
*H04W 4/06* (2009.01)
*H04W 72/04* (2009.01)
*H04W 84/12* (2009.01)

(52) U.S. Cl.
CPC ......... *H04W 52/0235* (2013.01); *H04W 4/06* (2013.01); *H04W 72/04* (2013.01); *H04W 84/12* (2013.01)

(58) Field of Classification Search
CPC ................................. H04W 52/0235
See application file for complete search history.

(56) References Cited

U.S. PATENT DOCUMENTS

| | | | | |
|---|---|---|---|---|
| 2006/0267841 A1* | 11/2006 | Lee | ...................... | G01S 5/0081 342/463 |
| 2010/0046479 A1* | 2/2010 | Sampath | ............. | H04W 52/241 370/335 |
| 2016/0021661 A1* | 1/2016 | Yerramalli | ............ | H04W 72/00 370/329 |
| 2016/0128074 A1* | 5/2016 | Huang | .................... | H04L 69/22 370/329 |
| 2017/0181090 A1* | 6/2017 | Park | .................. | H04W 52/0235 |
| 2018/0019902 A1* | 1/2018 | Suh | ...................... | H04L 27/2602 |
| 2018/0184379 A1* | 6/2018 | Liu | ........................ | H04L 27/10 |
| 2018/0270756 A1* | 9/2018 | Bhattad | ............. | H04W 52/0225 |
| 2019/0059056 A1* | 2/2019 | Islam | ................ | H04W 52/0216 |

* cited by examiner

*Primary Examiner* — Kevin M Cunningham
(74) *Attorney, Agent, or Firm* — Sterne, Kessler, Goldstein & Fox P.L.L.C.

(57) ABSTRACT

The present disclosure describes an electronic device configured to concurrently transmit wake-up radio (WUR) packets in a duplicated WUR transmission mode, non-duplicated WUR transmission mode, and/or mixed WUR transmission mode in one or more channels of a wideband basic service set (BSS) communication. Receiving electronic devices may be grouped together and assigned to monitor for the WUR packets. For example, the receiving electronic devices may be assigned to a position within the one or more channels to monitor for the WUR packets.

19 Claims, 9 Drawing Sheets

APPARATUS AND METHOD FOR WAKE-UP RADIO TRANSMISSION MODES

CROSS-REFERENCE TO RELATED APPLICATIONS

This application claims the benefit of U.S. Provisional Patent Application No. 62/553,074, filed on Aug. 31, 2017, titled "Wake-Up Radio Transmission Modes," which is hereby incorporated by reference in its entirety.

BACKGROUND

Field

The described embodiments generally relate to techniques for wake-up radio (WUR) communications.

Related Art

A wireless local area network (WLAN) station may include an ultra-lower power wake-up radio (WUR) that is a companion radio to a WLAN main radio. The ultra-lower power WUR includes a receiver that receives WUR packets to wake up the WLAN main radio from a sleep mode. Once the WLAN main radio is awake, the WLAN station can communicate with other electronic devices via the WLAN main radio.

SUMMARY

In some embodiments, an electronic device (e.g., an access point or a wireless communication device) may concurrently transmit wake-up radio (WUR) packets in a duplicated WUR transmission mode, where the first WUR packet is transmitted in a first channel of a wideband basic service set (BSS) communication, and a second WUR packet with identical information is transmitted in a second channel of the wideband BSS communication. WUR packets transmitted in the duplicated WUR transmission mode may include a WUR beacon. The WUR beacon may include an indication of a primary channel of a radio of the electronic device that transmits the WUR packets as well as an indication of a transmission power of the first channel. The transmission power may be used by a receiving Wireless Local Area Network (WLAN) station in conjunction with a received signal strength indicator (RSSI) to estimate a distance between the WLAN station and the electronic device transmitting the WUR packet, for example. In some embodiments, the electronic device may concurrently transmit a third WUR packet in the duplicated WUR transmission mode in the first channel of the wideband BSS communication so that two WUR packets may be sent in the duplicated WUR transmission mode over the first channel.

Some embodiments include the electronic device transmitting a fourth WUR packet in a non-duplicated WUR transmission mode in a third channel of the wideband BSS communication to cause the WLAN station's ultra-low power wake-up receiver to wake the WLAN station's main radio. The electronic device may subsequently transmit a wireless local area network (WLAN) packet that includes a request for information (e.g., current temperature of a thermostat) or a request for action (e.g., close window blinds).

Before transmitting the fourth WUR packet, some embodiments enable the electronic device to determine guidelines in which receiving WLAN stations may implicitly determine the third channel to monitor for future WUR packets (e.g., the fourth WUR packet). For example, the electronic device may use an explicit mode indicator found in the WUR beacon of the first WUR packet to inform the receiving WLAN station whether the channel assignment is implicit or whether the channel assignment is negotiable. If the channel assignment is implicit, the WLAN station's global unique identifier may be used to implicitly determine the third channel (e.g., a 20 MHz channel) that the WLAN station monitors for WUR packets. In addition, to determine the third channel, the global unique identifier may be used to implicitly determine a position within the third channel that the WUR packets will be situated when transmitted. The WLAN station can tune its ultra-low power wake-up receiver to listen for WUR packets at the implicitly determined third channel and position.

In some embodiments, the explicit mode indicator in the WUR beacon of the first WUR packet allows the WLAN station to explicitly negotiate a preferred channel and optionally a preferred position in the preferred channel where the WLAN station prefers to monitor for WUR packets. In this example, prior to transmitting the fourth WUR packet, the electronic device receives a WUR request frame from the WLAN station indicating a preferred channel, and the electronic device transmits a WUR response frame to the WLAN station indicating the explicitly-assigned third channel. In addition, the electronic device may assign a position within the explicitly-assigned third channel, where future WUR packets (e.g., the fourth WUR packet) will be located when they are transmitted on the third channel, and transmit the position assigned in the WUR response frame.

In some embodiments, the electronic device may increase capacity of the wideband BSS communication by assigning or grouping two or more WLAN stations to one 20 MHz channel of the wideband BSS communication. In addition, the electronic device may further group two or more WLAN stations to a position within the 20 MHz channel. For example, the electronic device may concurrently transmit a fifth WUR packet in a non-duplicated WUR transmission mode in the third channel of the wideband BSS communication. Thus, there may be two different WUR packets (e.g., the fourth and fifth WUR packets) sent in the third channel of the wideband BSS communication. In some embodiments, the fourth and fifth WUR packets may be positioned at different locations within the third channel. Further, in some embodiments, the fifth packet may be a multicast message directed to two or more WLAN stations assigned to monitoring the third channel at one of the different locations.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
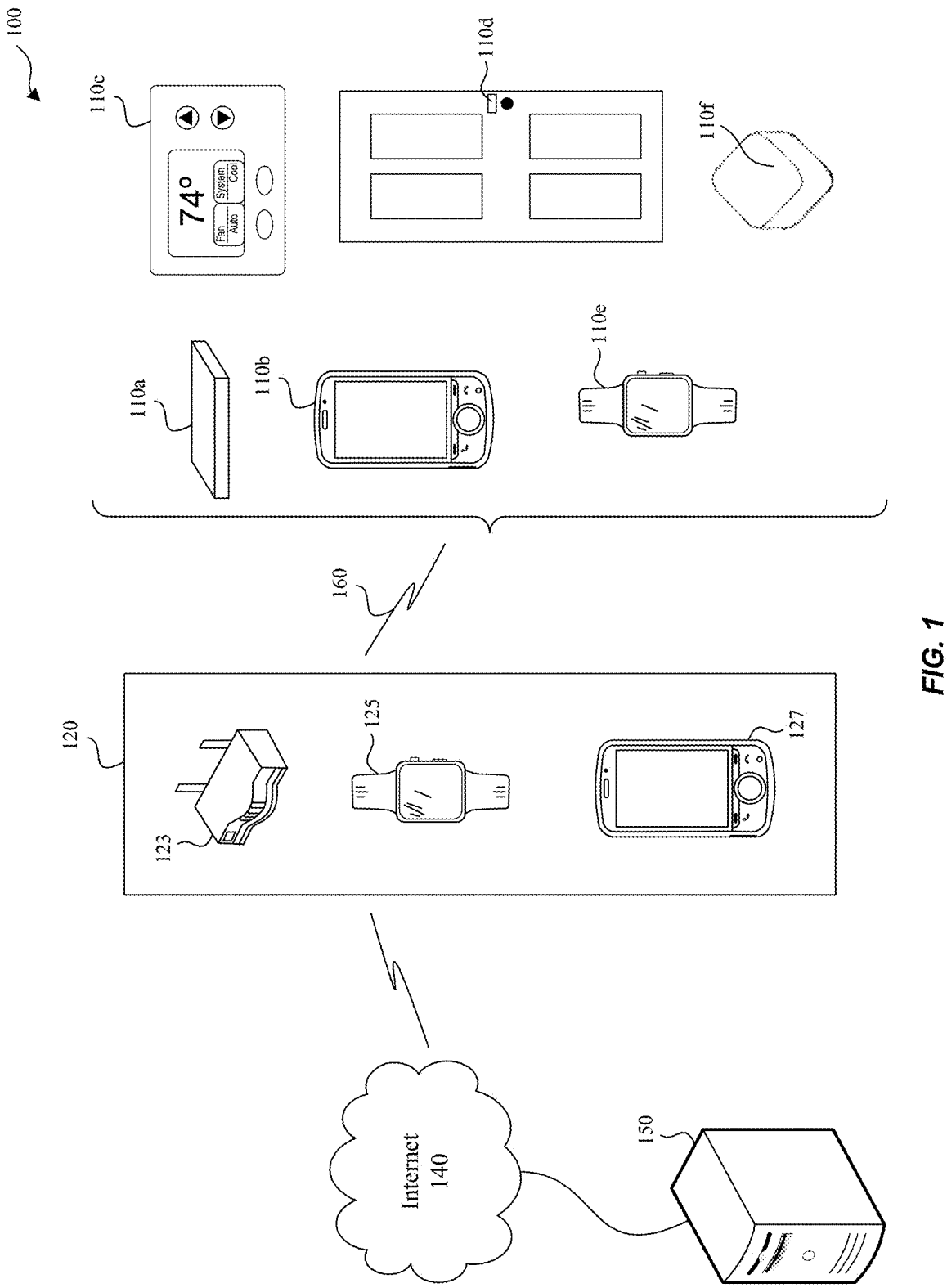
FIG. 1 illustrates an example system with electronic devices enabled with duplicated, non-duplicated, and mixed wake-up radio (WUR) transmission modes, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Electronic devices, such as Wireless Local Area Network (WLAN) stations, can be battery-powered and can communicate via WLAN packets (e.g., Wi-Fi packets). To conserve battery power, the electronic devices can set their WLAN main radio in a sleep mode (or other low power mode) and can rely on a companion ultra-low power radio receiver to wake up the WLAN main radio when needed. For example, when the ultra-low power radio receiver receives a wake-up radio (WUR) packet, the ultra-low power radio receiver can transmit a signal to wake the WLAN main radio. Once awake, the WLAN main radio can receive WLAN packets.

A wideband basic service set (BSS) may include one or more electronic devices that communicate using one or more 20 MHz channels. Some embodiments enable a concurrent transmission of wake-up radio (WUR) packets—over the one or more 20 MHz channels—in duplicated, non-duplicated, and/or mixed WUR transmission modes. In the concurrent transmission, at least some portions of the respective transmissions overlap.

Duplicated WUR transmission mode in a wideband BSS communication: identical WUR packets may be concurrently transmitted in different 20 MHz channels in a wideband BSS communication or in the same 20 MHz channel. As an example, up to 5 WUR packets may be transmitted in one 20 MHz channel;

Non-duplicated WUR transmission mode in a wideband BSS communication: different WUR packets may be concurrently transmitted in different 20 MHz channels in a wideband BSS communication or in the same 20 MHz channel; and Mixed WUR transmission mode in a wideband BSS communication: a combination of (i) identical WUR packets concurrently transmitted in the duplicated WUR transmission mode in one or more 20 MHz channels of a wideband BSS communication and (ii) different WUR packets concurrently transmitted in the non-duplicated WUR transmission mode in one or more 20 MHz channels of the same wideband BSS communication.

FIG. 1 illustrates an example system 100 with electronic devices enabled with duplicated, non-duplicated, and mixed wake-up radio (WUR) transmission modes, according to some embodiments of the disclosure. Example system 100 is provided for the purpose of illustration and is not limiting of the disclosed embodiments. System 100 may include but is not limited to WLAN-enabled devices—such as WLAN stations 110a-110f, an access point (AP) 120, the Internet 140, and a server 150—associated with a wideband BSS. AP 120 may include electronic devices such as a wireless router 123, a wearable device 125 (e.g., a smart watch), a wireless communication device 127, or a combination thereof. WLAN stations 110a-110f may include an Internet of Things (IoT) device 110a (e.g., a refrigerator sensor device), a wireless communications device 110b, a thermostat 110c, an entry transponder device 110d, a wearable device 110e, an entertainment device 110f, or a combination thereof, in which one or more of WLAN stations 110a-110f may be powered by a battery. Wireless communication device 127 and 110b may be a smart phone or another computing device including but not limited to a laptop, desktop, tablet, or personal digital assistant (PDA). As an example, AP 120 may query WLAN 110a and 110c for current temperatures and/or may set thermostat 110c; AP 120 may also lock/unlock or open doors associated with WLAN station 110d. In other examples, AP 120 may query or set sensors in wearable devices such as WLAN station 110e, as well as query or set functions in WLAN station 110b.

To conserve battery power, one or more of WLAN stations 110a-110f may set their WLAN main radios to a sleep mode. When WLAN communication is needed, one or more of WLAN stations 110a-110f may receive a wake-up radio (WUR) packet as part of a wideband BSS communication that causes their respective WLAN main radios to wake up. In turn, the WLAN main radios can receive a WLAN packet that includes, for example, a request for information (e.g., a temperature request) or a request for action (e.g., open windows or blinds).

Some or all of WLAN stations 110a-110f may have a WLAN main radio that operates on one channel and receives WUR packets on a different channel. In some embodiments, some or all of WLAN stations 110a-110f may have a WLAN main radio that operates on one channel and receives WUR packets on the same channel. Although the disclosure describes examples where WLAN main radios enter a sleep mode and receives WUR packets, the embodiments are not limited to those cases. In some embodiments, the WLAN main radios may remain active and also receive WUR packets.

To conserve battery power, one or more of WLAN stations 110a-110f may set their respective WLAN main radios into a sleep mode. While the WLAN stations 110a-110f are in sleep mode, a user may request information from or an action of WLAN stations 110a-110f. The request may be transmitted from AP 120, or from server 150, via Internet 140, to access point (AP) 120. AP 120 may transmit the request via a WLAN interface 160 to one or more WLAN stations 110a-110f.

Before transmitting the request to one or more WLAN stations 110a-110f, AP 120 may transmit a wideband BSS communication that includes WUR packets to wake the one or more corresponding WLAN main radios in WLAN stations 110a-110f. After the WLAN main radios have awaken, AP 120 may transmit a wideband BSS communication—that includes the request for information (e.g., request for current temperature, sensor data, GPS location, etc.) from various WLAN stations 110a-110f in WLAN packets—to the one or more WLAN stations 110a-110f.

In some embodiments, the WUR packets in the wideband BSS communication may be transmitted by AP 120 in duplicated, non-duplicated, and/or mixed WUR transmission modes in different 20 MHz channels. In some embodiments, the WUR packets may be transmitted in duplicated or non-duplicated WUR transmission modes in a single 20 MHz channel. Further, some or all of WLAN stations 110a-110f may be grouped to monitor a 20 MHz channel of a wideband BSS communication or a particular position within the 20 MHz channel of the wideband BSS communication. According to some embodiments, instead of one 20 MHz channel serving one WLAN station, one 20 MHz channel can serve a group of WLAN stations 110a-110f when AP 120 transmits, for example, a multicast message in a WUR packet. Further, a position within one 20 MHz channel can serve a group of WLAN stations 110a-110f when AP 120 transmits a multicast message in the WUR packet. The grouping of WLAN stations to monitor a 20 MHz channel increases the capacity of a wideband BSS communication. The duplicated, non-duplicated, and mixed WUR transmission modes are described in more detail below.

Figure 2:
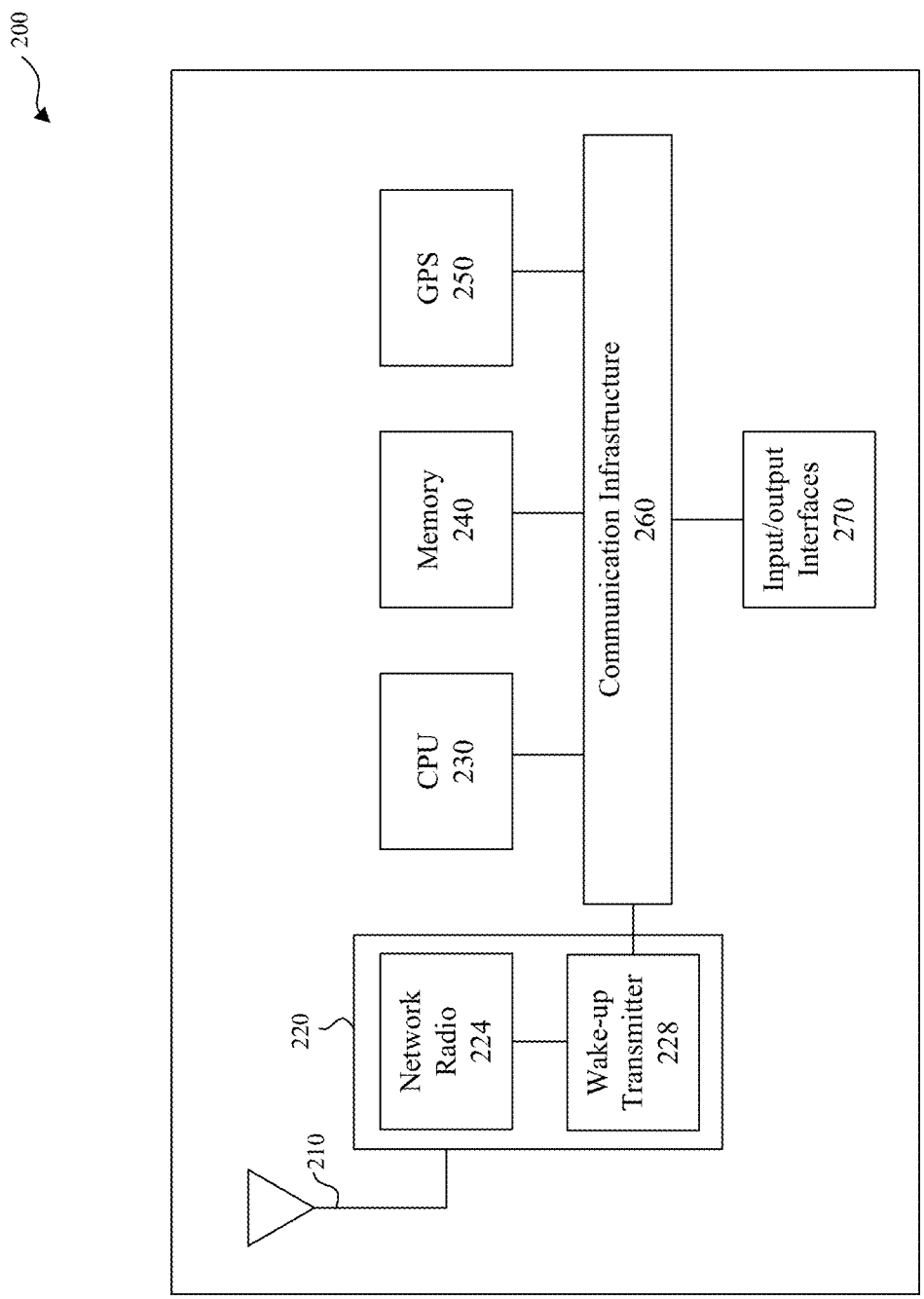
FIG. 2 illustrates a block diagram of an example system for transmitting WUR packets in duplicated, non-duplicated, and mixed WUR transmission modes, according to some embodiments of the disclosure.

FIG. 2 illustrates a block diagram of an example system 200 for transmitting WUR packets in duplicated, non-duplicated, and mixed WUR transmission modes, according to some embodiments of the disclosure. For explanation purposes, example system 200 may be described with elements from FIG. 1. Examples of system 200 may include AP 120.

System 200 may include an antenna 210, a radio 220 that includes a WLAN network radio 224 and a wake-up transmitter 228, a central processing unit (CPU) 230, a memory 240, a global positioning system (GPS) 250, a communication infrastructure 260, and input/output interfaces 270. Radio 220 may be coupled to antenna 210, and network radio 224 may perform WLAN transmit and receive functions. Wake-up transmitter 228 may transmit WUR packets to WLAN stations (e.g., some or all of WLAN stations 110a-110f) on the same or different channels than network radio 224. CPU 230 may include one or more processors coupled to communication infrastructure 260. Memory 240 may include random access memory (RAM) and/or cache and may include control logic (e.g., computer software) and/or data. The computer software may enable CPU 230 to perform, for example, actions to create a request (e.g., a temperature request as described above with respect to FIG. 1). GPS 250 may determine the location of system 200. Communication infrastructure 260 may be, for example, a bus or other such interconnect. Input/output interfaces 270 may include, for example, a touch-sensitive display, microphone, speakers, or a combination thereof.

The WLAN transceiver of radio 220 may transmit a wideband BSS communication including multiple WUR packets to one or more WLAN stations 110a-110f. The WUR packets may be transmitted in duplicated, non-duplicated, and/or mixed WUR transmission modes to the one or more WLAN stations 110a-110f. The duplicated, non-duplicated, and mixed WUR transmission modes are described in more detail below.

Figure 3:
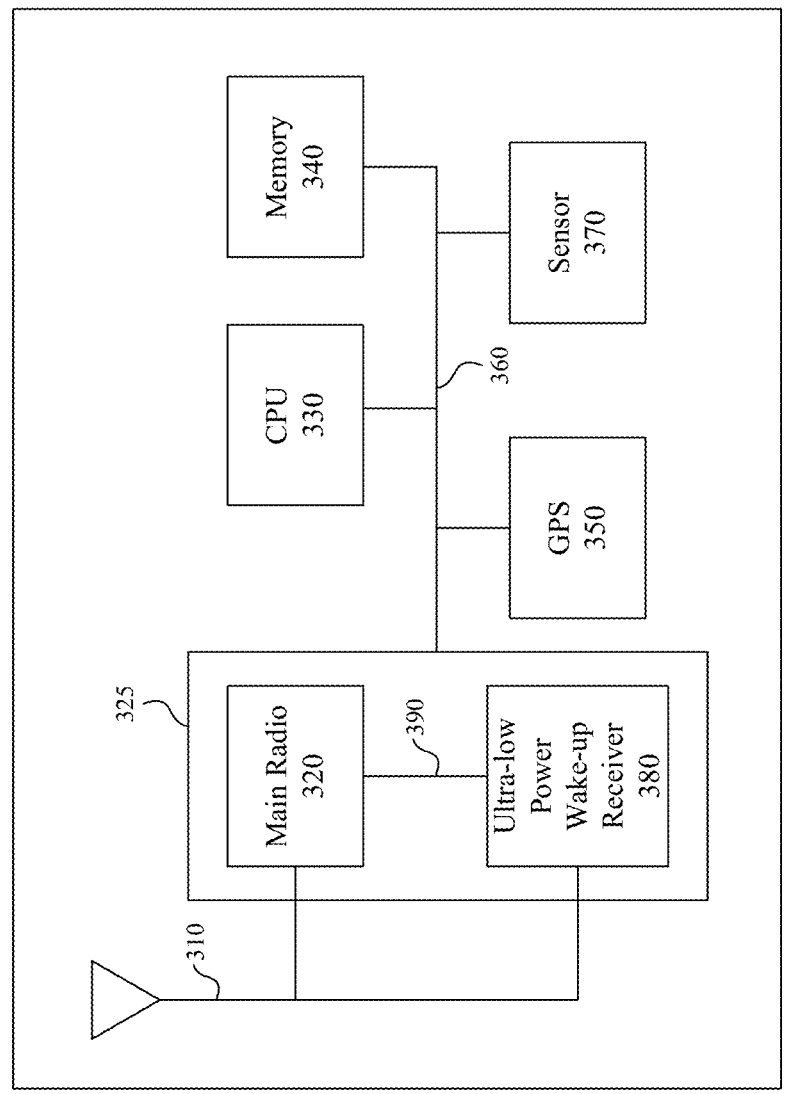
FIG. 3 illustrates a block diagram of an example system for receiving WUR packets in duplicated and non-duplicated WUR transmission modes, according to some embodiments of the disclosure.

FIG. 3 illustrates a block diagram of an example system 300 for receiving WUR packets, according to some embodiments of the disclosure. For explanation purposes, example system 300 may be described with elements from previous figures. Examples of system 300 may include WLAN stations such as, for example, one or more of WLAN stations 110a-110f from FIG. 1.

System 300 may include an antenna 310 coupled to a radio 325, a central processing unit (CPU) 330, a memory 340, a GPS 350, a communication infrastructure 360, and a sensor 370. Memory 340 may include random access memory (RAM) and/or cache and may include control logic (e.g., computer software) and/or data. GPS 350 may determine the location of system 300. The computer software may enable CPU 330 to perform actions to satisfy a request (e.g., a temperature request as described above with respect to FIG. 1). Sensor 370 may measure and collect data associated with the request. Examples of sensor 370 include but are not limited to a biosensor (or biometric sensor) (e.g., monitoring heart rate, body temperature, and blood pressure) and/or an environmental sensor (e.g., measuring ambient temperature, radiation, and humidity or detecting a presence of certain chemicals). Communication infrastructure 360 may be, for example, a bus or other such interconnect. Radio 325 includes a main radio 320 coupled to an ultra-low power wake-up receiver 380.

In some embodiments, main radio 320 includes a WLAN transceiver that performs WLAN transmit and receive functions. To conserve battery power, main radio 320 may be set in a sleep mode (or other low power mode), while ultra-low power wake-up receiver 380 is set in an active mode. Ultra-low power wake-up receiver 380 may have a target power of, for example, less than 100 microwatts in the active mode. When ultra-low power wake-up receiver 380 receives a WUR packet via antenna 310, ultra-low power wake-up receiver 380 transmits a signal to main radio 320 (via a connection 390) to wake main radio 320 (or cause main radio 320 to transition to a relatively higher power mode). Once main radio 320 is awake, main radio 320 may receive a WLAN packet via antenna 310. In some embodiments, the WLAN packet may include a request for information or an action.

A wideband BSS communication may include communication channels that can be subdivided into 20 MHz channels (e.g., 40 MHz, 80 MHz, and 160 MHz, etc.). For example, a wideband BSS communication channel of 40 MHz includes two 20 MHz channels, a wideband BSS communication channel of 80 MHz includes four 20 MHz channels, and a wideband BSS communication channel of 160 MHz includes eight 20 MHz channels. System 200 of FIG. 2 (e.g., AP 120) may transmit a wideband BSS communication at, for example, 80 MHz to communicate with four different systems 300 (e.g., WLAN stations 110a-110d). The communication to each of the four different systems 300 can be over a different 20 MHz communication channel. In some embodiments, system 200 may concurrently transmit WUR packets in a wideband BSS communication in a duplicated WUR transmission mode, a non-duplicated WUR transmission mode, or a mixed WUR transmission mode. These transmission modes are described in more detail below.

Figure 4A:
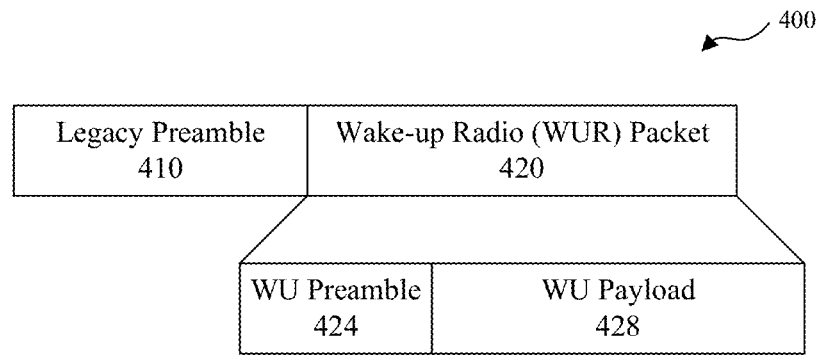
FIG. 4A illustrates an example data packet for a 20 MHz transmission associated with a wideband basic service set (BSS), according to some embodiments of the disclosure.

FIG. 4A illustrates an example data packet 400 for a 20 MHz transmission of a wideband BSS communication, according to some embodiments of the disclosure. For explanation purposes, example data packet 400 may be described with elements from previous figures. Data packet 400 may be transmitted from system 200 of FIG. 2 (e.g., AP 120) to system 300 of FIG. 3 (e.g., WLAN station 110) in a 20 MHz channel of a wideband BSS communication (e.g., a communication channel having a plurality of 20 MHz channels). For example, radio 220 or wake-up transmitter 228 of FIG. 2 may transmit data packet 400 in a 20 MHz channel of a wideband BSS communication to ultra-low power wake-up receiver 380 of FIG. 3. In some embodiments, data packet 400 includes a legacy preamble 410 and a WUR packet 420. WUR packet 420 includes a Wake-up (WU) preamble 424 and a WU payload 428. WUR payload 428 contains control and management information for WLAN station 110. For example, the control and management information may contain system 200's identifier (e.g., AP 120's identifier) and system 300's identifier (e.g., WLAN station 110's identifier) so that WLAN station 110 can decide if a WUR packet is intended for itself.

In a duplicated WUR transmission mode, system 200 concurrently conveys the same data packet 400 on different 20 MHz channels of the wideband BSS. For example, in the duplicated WUR transmission mode, a WUR beacon may be transmitted in data packet 400 and may be copied and transmitted to one or more systems 300 (e.g., WLAN stations 110a-110f) to keep the systems' respective ultra-low power wake-up receivers 380 synchronized when their respective main radios 320 are in sleep mode. For example, one or more systems 300 may not know a corresponding system 200 (e.g., AP 120) in communication with the one or more systems 300. By transmitting a WUR beacon in data packet 400 in the duplicated WUR transmission mode and over multiple 20 MHz channels, system 200 provides multiple opportunities for one or more systems 300 to detect the WUR beacon in any of the 20 MHz channels; in turn, the one or more systems 300 can quickly discover the wideband BSS network. Without the duplicated WUR beacons, systems 300 may expend additional scan time to detect the WUR beacon, thus consuming additional battery power.

Figure 4B:
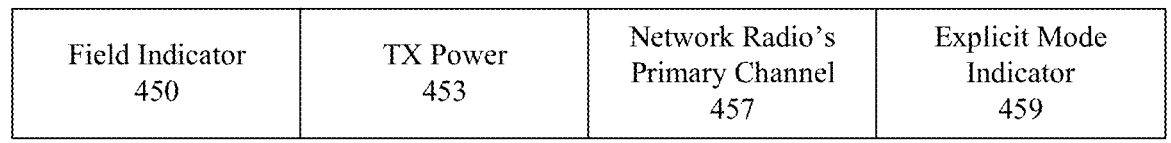
FIG. 4B illustrates example data packet fields associated with a WUR beacon, according to some embodiments of the disclosure.

The WUR beacon can include multiple data packet fields. FIG. 4B illustrates example data packet fields 440 associated with the WUR beacon, according to some embodiments of the disclosure. For explanation purposes, data packet fields 440 of FIG. 4B may be described with elements from previous figures. Data packet fields 440 may be included in WU Payload 428 of data packet 400. Data packet fields 440 may include a field indicator 450, transmit (TX) power 453, a network radio primary channel 457 (e.g., associated with system 200), and an explicit mode indicator 459. Transmit power 453 may include a transmit power of a 20 MHz channel of a wideband BSS communication rather than the transmit power of the entire wideband BSS communication. In some embodiments, transmit power 453 can be used to estimate a distance between systems 200 and 300. For example, the transmit power for an 80 MHz wideband BSS transmission may be distributed across four 20 MHz channels. System 200 (e.g., wake-up transmitter 228) may transmit the WUR beacon to one or more of systems 300 using the four 20 MHz channels. Based on the value of transmit power 453 in the WUR beacon and a received signal strength indication (RSSI), system 300 can estimate the distance between itself and system 200.

Network radio's primary channel 457 may include, for example, a primary operating channel for network radio 224 of system 200 (e.g., AP 120). A system 300 may roam into the area, receive (e.g., via ultra-low power wake-up receiver 380) the WUR beacon and network radio's primary channel 457. If the received signal strength indicator (RSSI) of the WUR beacon satisfies a threshold value, then system 300 may choose to tune main radio 320 to the primary channel as indicated in the received network radio's primary channel 457.

Explicit mode indicator 459 informs a receiving system 300 whether system 300 may explicitly negotiate a 20 MHz WUR channel (e.g., a corresponding WUR channel index) or whether system 300 is implicitly assigned to a particular 20 MHz WUR channel based on an identifier of system 300 (e.g., a station identifier, a MAC address, or a global unique identifier).

Based on a policy, system 200 may determine to include one or more fields of data packet fields 440 of FIG. 4B. For example, AP 120 may include transmit power 453 in one out of 5 WUR beacons and may include network radio's primary channel 457 in one out of every 8 WUR beacons.

Figure 5C:
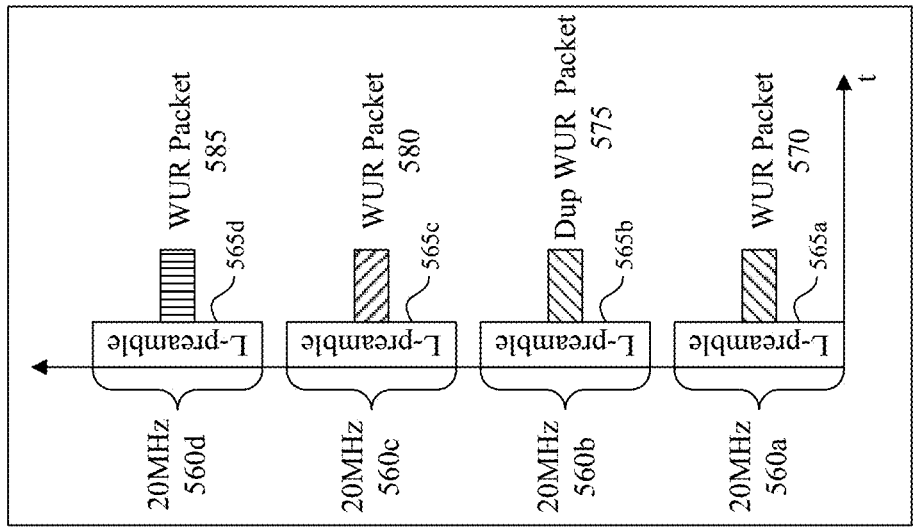
FIG. 5C illustrates an example of mixed WUR transmission modes of a wideband BSS communication, according to some embodiments of the disclosure.
Figure 5B:
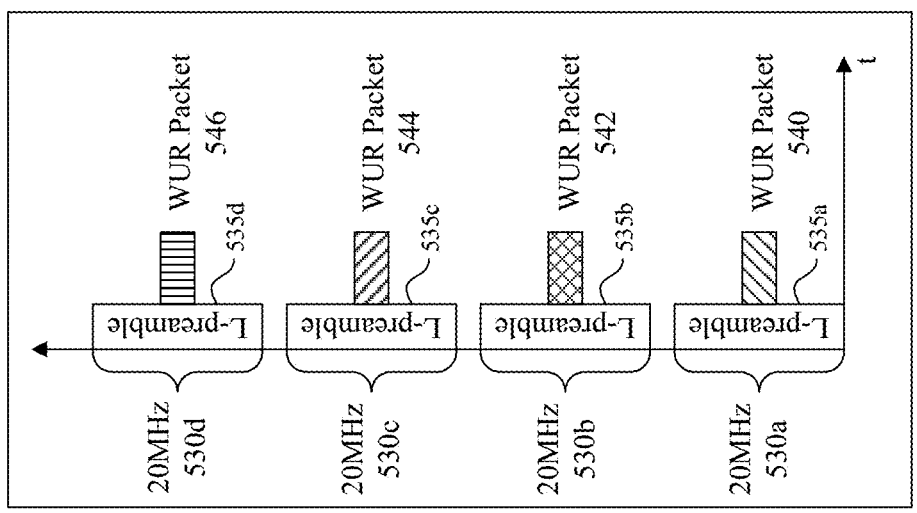
FIG. 5B illustrates an example of non-duplicated WUR transmission modes of a wideband BSS communication, according to some embodiments of the disclosure.
Figure 5A:
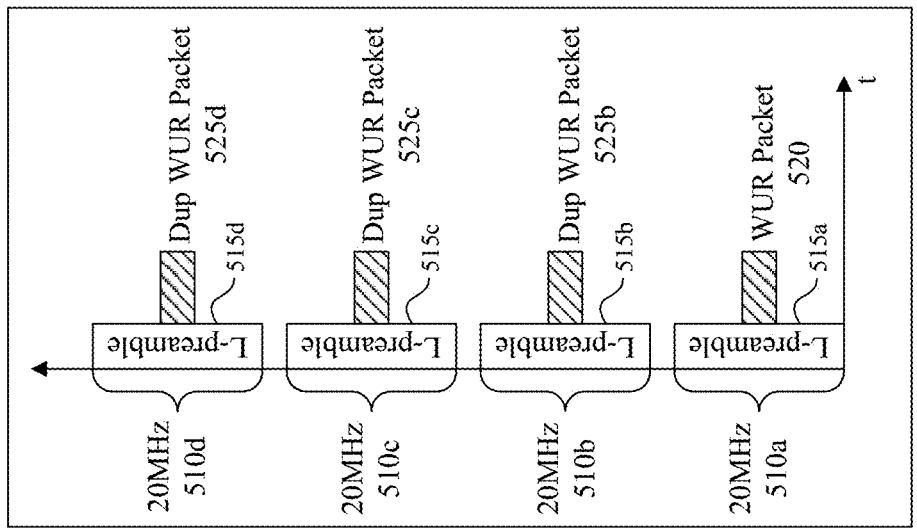
FIG. 5A illustrates an example of a duplicated WUR transmission mode associated with a wideband BSS communication, according to some embodiments of the disclosure.

FIG. 5A illustrates an example of a duplicated WUR transmission mode of a wideband BSS communication, according to some embodiments of the disclosure. For explanation purposes, FIG. 5A may be described with elements from previous figures. In FIG. 5A, the wideband BSS communication includes an 80 MHz channel composed of four 20 MHz channels 510a-510d. In other examples the wideband BSS communication may be a different multiple of 20 MHz channels. In FIG. 5A, system 200 concurrently transmits four data packets, in which each data packet can be similar to data packet 400 of FIG. 4A.

20 MHz channel 510a includes a respective legacy preamble 515a followed by a 4 MHz narrowband transmission of WUR packet 520. The remaining 20 MHz channels 510b-510d include respective legacy preambles 515b-515d and respective duplicated WUR packets 525b-525d that include the same information as WUR packet 520. Each of WUR packets 520 and 525b-525d may be set in a fixed position within a 20 MHz channel, according to some embodiments of the present disclosure. For example, to minimize interference from adjacent 20 MHz channels, WUR packets 520 and 525b-525d may be set on the center 4 MHz within their respective 20 MHz channels. Other locations are also possible to accommodate for more than one WUR packet (see, e.g., FIGS. 8A-8C) transmitted in the same 20 MHz channel.

In some embodiments, system 200 conveys different information on different 20 MHz channels in a non-duplicated WUR transmission mode. FIG. 5B illustrates example of non-duplicated WUR transmission modes of a wideband BSS communication, according to some embodiments of the disclosure. For explanation purposes, FIG. 5B may be described with elements from previous figures. In the non-duplicated WUR transmission mode, the content of WUR packets on different 20 MHz channels can be different.

Further, different systems 300 (e.g., WLAN stations 110a-110f) can be grouped to monitor a 20 MHz channel.

Grouping systems 300 to a 20 MHz channel can increase the capacity of a wideband BSS transmission. For example, the wideband BSS transmission may wake up 4 groups of systems 300, where each group of systems 300 receives a WUR packet on a different 20 MHz channel. As shown in FIG. 5B, the wideband BSS communication includes an 80 MHz channel composed of four 20 MHz channels 530a-530d. System 200 concurrently transmits four different WUR packets. In another example, one wideband BSS transmission may wake up a system 300 (e.g., WLAN station 110a) on one 20 MHz channel by transmitting a unicast signal and also wake up a group of systems 300 (e.g., WLAN stations 110b-c) on a different 20 MHz channel using a multicast signal.

Each of 20 MHz channels 530a-d includes a respective legacy preamble 535 followed by a different WUR packet (540, 542, 544, and 546). In FIG. 5B, in some embodiments, WUR packet 540 may include a WUR beacon signal with a different transmit power value than the WUR beacon of WUR packet 542. WUR packet 544 may be a multicast message for a group of systems 300 (e.g., WLAN stations 110a-110c), and WUR packet 546 may be a unicast message for a system 300 (e.g., WLAN station 110d), according to some embodiments of the disclosure.

In some embodiments, system 200 conveys WUR packets in a mixed WUR transmission mode where one or more WUR packets are transmitted in a duplicated WUR transmission mode and one or more WUR packets are transmitted in a non-duplicated WUR transmission mode. FIG. 5C illustrates example mixed WUR transmission modes associated with a wideband BSS, according to some embodiments of the disclosure. For explanation purposes, FIG. 5C may be described with elements from previous figures. Each of 20 MHz channels 560a-d includes a respective legacy preamble 565 followed by a WUR packet. In FIG. 5C, duplicate WUR packet 575 and WUR packet 570 are transmitted in a duplicated WUR transmission mode, in which duplicate WUR packet 575 includes the same information as WUR packet 570 (e.g., both include a WUR beacon with an identical transmit power). In addition, WUR packet 580 may be a multicast message directed to a group of systems 300 (e.g., WLAN stations 110b-110d), and WUR packet 585 may be a unicast message for a system 300 (e.g., WLAN station 110a).

To inform systems 300 (e.g., WLAN stations 110a-110f) of a 20 MHz channel that each system 300 should monitor, a WUR beacon may include explicit mode indicator 459. In some embodiments, explicit mode indicator informs a receiving system 300 whether the system 300 may explicitly negotiate a particular 20 MHz channel (e.g., a corresponding channel index) or whether the system 300 is implicitly assigned to a particular 20 MHz channel. For example, when explicit mode indicator 459 is set to '1', the receiving system 300 may negotiate a particular channel index (e.g., a preferred 20 MHz channel) with system 200. When explicit mode indicator 459 is '0', the channel assignment may be implicit and may be based on system guidelines. In some embodiments, the system guidelines may be based on a global unique identifier of system 300 (e.g., MAC address or station identifier) to determine a channel assignment. For example, with a 40 MHz channel of a wideband BSS communication having an upper 20 MHz channel and a lower 20 MHz channel, a system 300 with an odd global unique identifier may monitor the lower 20 MHz channel while another system 300 with an even global unique identifier may monitor the upper 20 MHz channel. In another example of a wideband BSS communication with four 20 MHz channels, the assignment may be determined by performing a modulo by 4 operation. In some embodiments, guidelines for implicit channel assignments may be determined by system 200 (e.g., AP 120).

Figure 6:
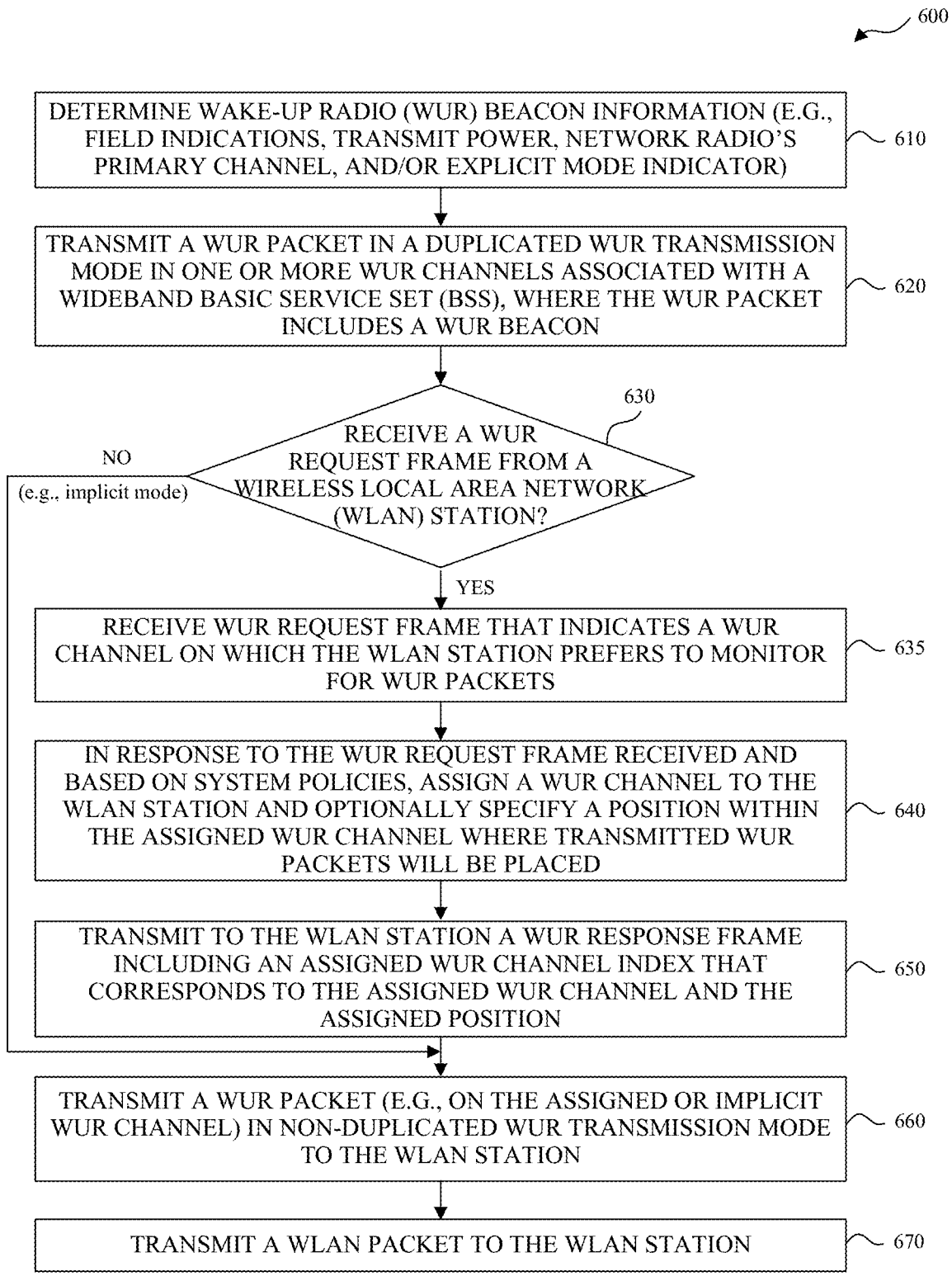
FIG. 6 illustrates an example method for transmitting a WUR packet in a duplicated and non-duplicated transmission mode, according to some embodiments of the disclosure.

FIG. 6 illustrates an example method 600 for transmitting a WUR packet in a duplicated and non-duplicated WUR transmission mode, according to some embodiments of the disclosure. For explanation purposes, method 600 may be described with elements from the previous figures. For example, method 600 may be performed by system 200 (e.g., AP 120). Based on the description herein, other systems may perform the operations of method 600; these other systems are within the spirit and scope of the disclosure. It is to be appreciated that not all operations may be needed to perform the disclosure provided herein. Further, some of the operations may be performed simultaneously or in a different order than shown in FIG. 6.

At 610, system 200 determines information for a WUR beacon. Examples of the information includes a field indicator 450, transmit (TX) power 453, network radio's primary channel 457, and/or explicit mode indicator 459 of FIG. 4. As described earlier, each of these fields may be provided based on a system policy, e.g., policy of system 200. For example, if system 200 decides to implement implicit channel assignments according to guidelines (e.g., modulo 4 operation on an WLAN station's global unique identifier), that information may be conveyed in the WUR beacon and reflected in explicit mode indicator 459.

At 620, system 200 (e.g., wake-up transmitter 228) transmits one or more WUR packets in a duplicated WUR transmission mode in one or more 20 MHz WUR channels of a wideband BSS communication, where the WUR packet includes the WUR beacon.

At 630, a determination is made whether a WUR request frame is received from a WLAN station 110. For example, explicit mode indicator 459 may have been set to '1' in the WUR beacon received by an WLAN station 110 indicating that explicitly requesting a preferred WUR channel is possible. If a WUR request frame is received, method 600 proceeds to 635. If a WUR request frame is not received, method 600 proceeds to 660. For example, if explicit mode indicator 459 is set to '0', then a receiving WLAN station 110 may not explicitly request a preferred WUR channel or a position within the preferred WUR channel to monitor. Instead, the receiving WLAN station 110 may implicitly determine a WUR channel based on a global unique identifier of the WLAN station 110. Thus, WLAN station 110 would not transmit a WUR request frame to explicitly request a preferred WUR channel.

Figure 4C:
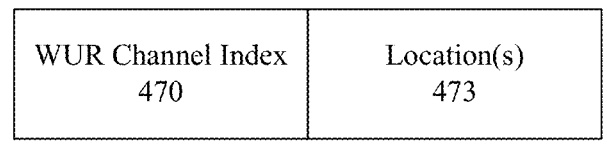
FIG. 4C illustrates example data packet fields associated with a non-duplicated WUR transmission mode, according to some embodiments of the disclosure.

FIG. 4C illustrates example data packet fields 460 associated with a non-duplicated WUR transmission mode, according to some embodiments of the disclosure. For explanation purposes, data packet fields 460 of FIG. 4C may be described with elements from previous figures. Data packet fields 460 may be included in WU Payload 428 of data packet 400. Data packet fields 460 may include a WUR channel index 470 that indicates a number corresponding to a 20 MHz channel of a wideband BSS communication and a location 473 that indicates a fixed position within the corresponding 20 MHz WUR channel. For example, up to 5 different WUR packets may be transmitted in a 20 MHz WUR channel where each of the WUR packets is transmitted in a fixed position within the 20 MHz WUR channel.

At 635, system 200 receives the information in the WUR request frame that indicates a WUR channel on which WLAN station 110 prefers to monitor for WUR packets. The preferred WUR channel may be identified by WUR channel index 470 of FIG. 4C. In addition, the WUR request frame may include a preferred position within the preferred WUR channel that WLAN station 110 prefers to monitor (e.g., the center 4 KHz of the 20 MHz preferred WUR channel). The preferred position may be identified by location 473 of FIG. 4C.

At 640, in response to the WUR request frame received (e.g., via network radio 224) and based on system policies, system 200 may assign a WUR channel to WLAN station 110 and may also specify a position within the assigned WUR channel where transmitted WUR packets are situated. In some embodiments, system 200 may optionally specify a position within the assigned WUR channel where transmitted WUR packets are situated. In the event multiple WUR packets are transmitted in a single 20 MHz WUR channel, the specified position may help reduce interference between the multiple WUR packets.

At 650, system 200 (e.g., network radio 224) may transmit a WUR response frame to WLAN station 110, in which the WUR response frame includes an assigned WUR channel index (e.g., WUR channel index 470) that corresponds to the assigned WUR channel and the assigned position (e.g., location 473).

At 660, when system 200 has information (e.g., a request) to transmit to WLAN station 110, system 200 (e.g., wake-up transmitter 228) may transmit WUR packet in non-duplicated WUR transmission mode to the WLAN station (e.g., to WLAN station's ultra-low power wake-up receiver 380). The WUR packet may be transmitted in the assigned WUR channel as described in 640 or in an implicitly determined WUR channel assignment as described in 610.

At 670, system 200 (e.g., wake-up transmitter 228) may transmit a WLAN packet (e.g., a request for information or an action) to the WLAN station, for example, after waiting a time period for WLAN station's ultra-low power wake-up receiver 380 to wake main radio 320.

Figure 7:
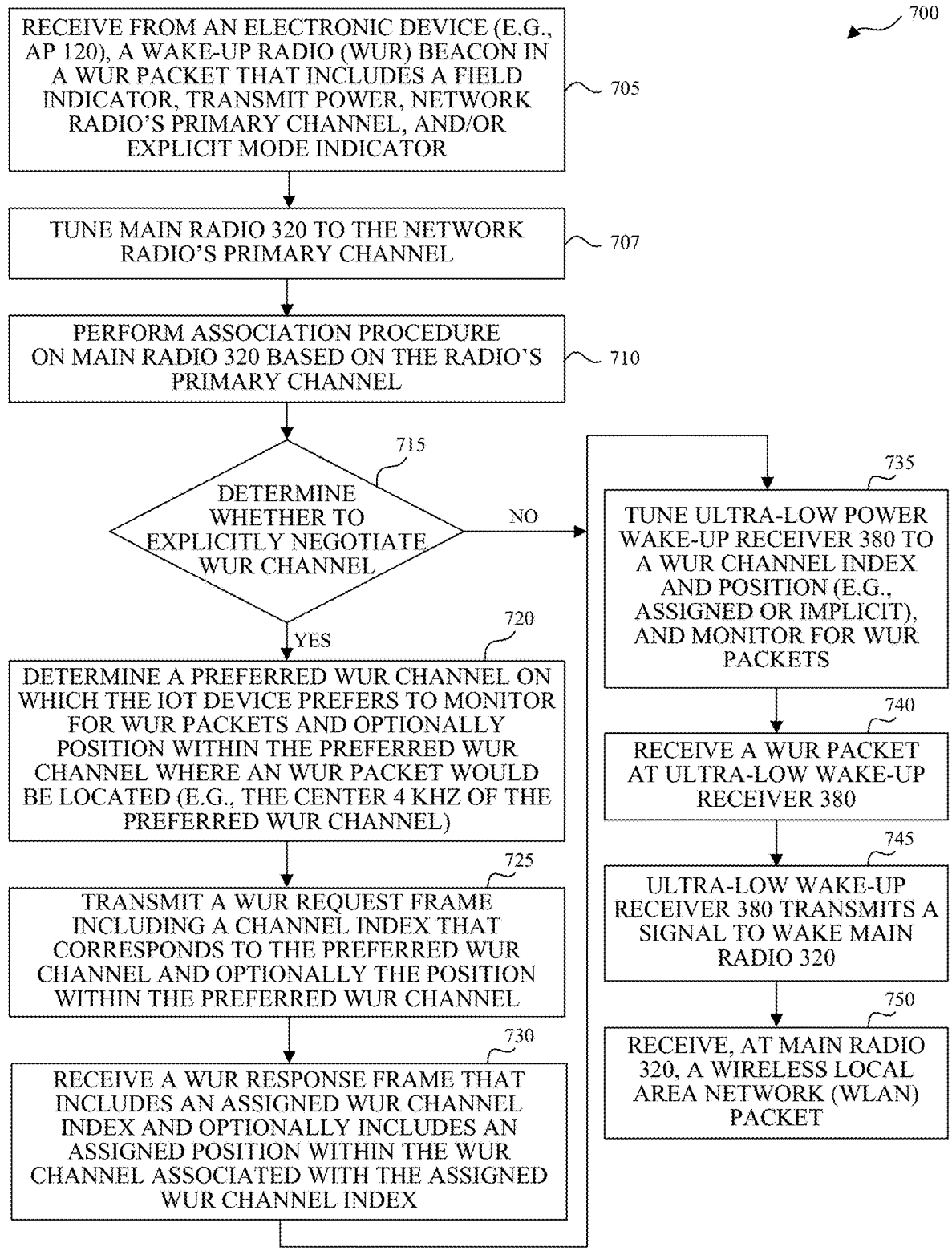
FIG. 7 illustrates an example method for receiving a WUR packet, according to some embodiments of the disclosure.

FIG. 7 illustrates an example method 700 for receiving a WUR packet, according to some embodiments of the disclosure. For explanation purposes, method 700 may be described with elements from previous figures. For example, method 700 may be performed by system 300 (e.g., an WLAN station 110). Based on the description herein, other systems may perform the operations of method 700; these other systems are within the spirit and scope of the disclosure. It is to be appreciated that not all operations may be needed to perform the disclosure provided herein. Further, some of the operations may be performed simultaneously or in a different order than shown in FIG. 7.

At 705, system 300 (e.g., ultra-low power wake-up receiver 380) may receive a WUR packet containing a WUR beacon. The WUR beacon may include field indicator 450, transmit (TX) power 453, network radio's primary channel 457, and/or explicit mode indicator 459 of FIG. 4B. System 300 may use transmit (TX) power 435 to estimate a distance between itself (e.g., WLAN station 110) and an electronic device that transmitted the WUR packet (e.g., AP 120). If explicit mode indicator 459 is set to '0', then system 300 may implicitly determine a WUR channel assignment based at least on a global unique identifier of WLAN station 110.

At 707, system 300 tunes main radio 320 to the primary channel of system 200 (e.g., AP 120) identified in network radio's primary channel 457.

At 710, system 300 may perform an association procedure on main radio 320 based on network radio's primary channel 457. For example, system 300 may transmit an Association Request packet to system 200 and receive an Association Response packet from system 300.

At 715, system 300 determines whether to explicitly negotiate a preferred WUR channel. For example, if explicit mode indicator 459 is set to '1', then system 300 may choose to request a preferred WUR channel on which system 300 (e.g., WLAN station 110) prefers to monitor for a WUR packet, where the preferred WUR channel may be the same as or different than network radio's primary channel 457 at 710. If system 300 has no particular WUR channel preference, system 300 may indicate no WUR channel index preference and no location preference accordingly. If system 300 chooses to negotiate a preferred WUR channel, then method 700 proceeds to 720. Otherwise, system 300 proceeds to 735.

At 720, system 300 may determine a preferred WUR channel on which it prefers to monitor for WUR packets. In some embodiments, system 300 may optionally identify a position within the preferred WUR channel where a WUR packet would be monitored and expected (e.g., the center 4 KHZ of the preferred channel).

At 725, system 300 (e.g., main radio 320) transmits a WUR request frame including a WUR channel index (e.g., WUR channel index 470) that corresponds to the preferred WUR channel and optionally transmits the position (e.g., location 473) within the preferred WUR channel.

At 730, system 300 receives a WUR response frame that includes an assigned channel index that corresponds to an assigned WUR channel and optionally includes an assigned position within the WUR channel associated with the assigned WUR channel index.

At 735, system 300 may tune ultra-low power wake-up receiver 380 to a WUR channel index and, if identified, a position within the WUR channel corresponding to the WUR channel index. The channel may correspond to an assigned WUR channel index and position from 730, the implicit WUR channel assignment determined at 705, or the network radio's primary channel 457 at 710.

At 740, system 300 receives a WUR packet at ultra-low power wake-up receiver 380.

At 745, ultra-low power wake-up receiver 380 wakes main radio 320.

At 750, system 300 receives, at main radio 320, a WLAN packet that may include a request (e.g., current refrigerator temperature, close blinds, etc.).

Receiving WLAN stations 110 may be grouped together and assigned to monitor for WUR packets on a single 20 MHz channel of a wideband BSS communication. Further, some of the WLAN stations 110 may be assigned to a position within the single 20 MHz channel to monitor for WUR packets. In addition, electronic devices (e.g., AP 120) may also send unicast and/or multicast messages.

Figure 8:
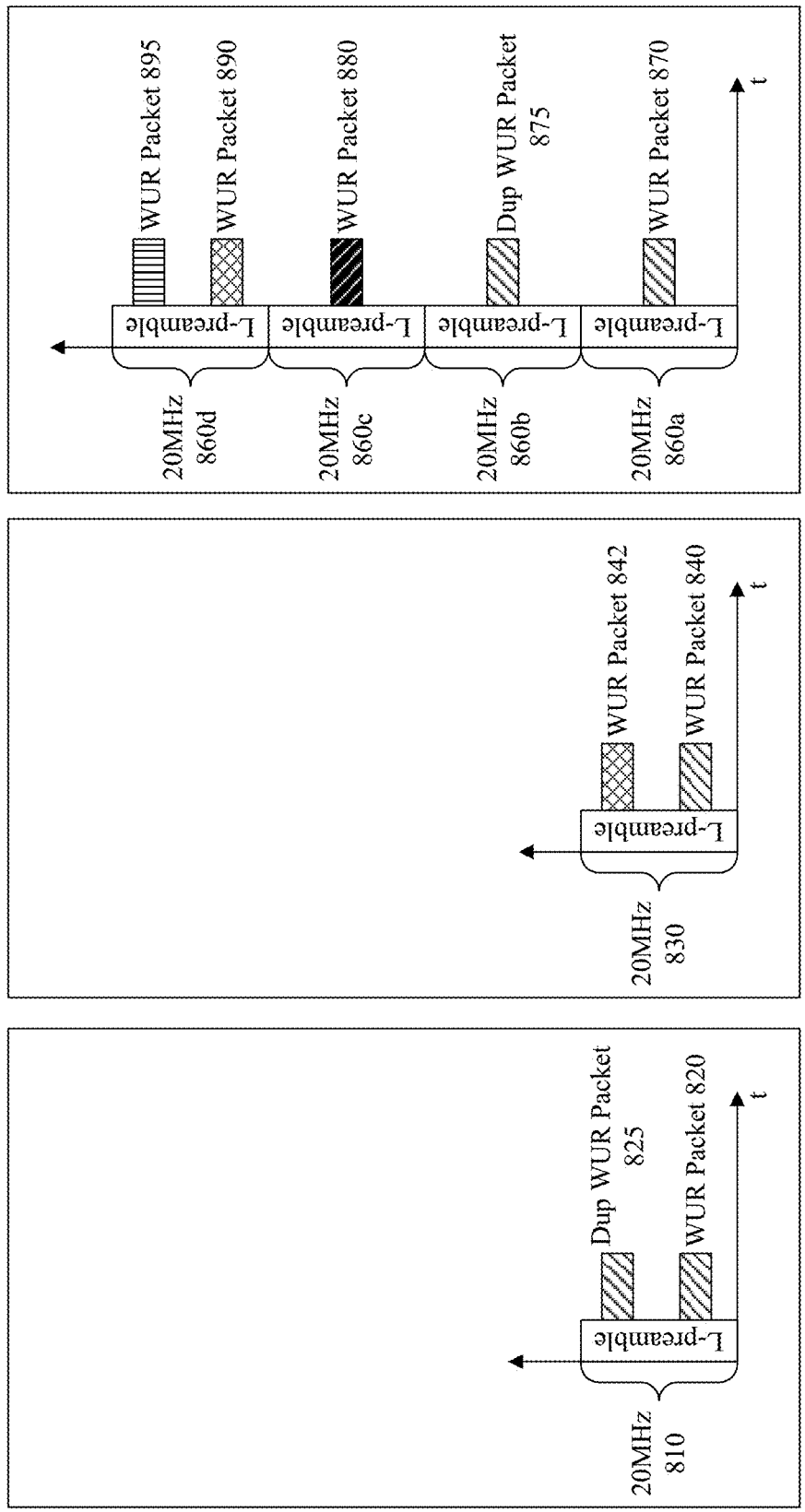
FIG. 8A illustrates an example of a duplicated WUR transmission mode in a channel of a wideband BSS communication, according to some embodiments of the disclosure.
FIG. 8B illustrates an example of a non-duplicated WUR transmission mode in a channel of a wideband BSS communication, according to some embodiments of the disclosure.
FIG. 8C illustrates an example of mixed WUR transmission modes in channels of a wideband BSS communication, according to some embodiments of the disclosure.

FIG. 8A illustrates an example of a duplicated WUR transmission mode in a channel of a wideband BSS communication, according to some embodiments of the disclosure. For explanation purposes, example 800 may be described with elements from previous figures. Example 800 includes 20 MHz channel 810 and WUR packet 820 and duplicate WUR packet 825. As an example, up to five WUR packets may be transmitted in a single 20 MHz channel.

FIG. 8B illustrates an example of a non-duplicated WUR transmission mode in a channel of a wideband BSS communication, according to some embodiments of the disclosure. For explanation purposes, example 803 may be described with elements from previous figures. Example 803 includes 20 MHz channel 830 and two different WUR packets 840 and 842.

FIG. 8C illustrates an example of mixed WUR transmission modes in channels of a wideband BSS communication, according to some embodiments of the disclosure. For explanation purposes, the example may be described with elements from previous figures. The example includes 20 MHz channels 860*a* and 860*b* with a WUR packet 870 and a duplicate WUR packet 875, respectively. 20 MHz channel 860*c* includes WUR packet 880 that may include a unicast message to one system 300 or a multicast message for a group of systems 300. 20 MHz channel 860*d* may include two different WUR packets 890 and 895 that may each include unicast or multicast messages.

Figure 9:
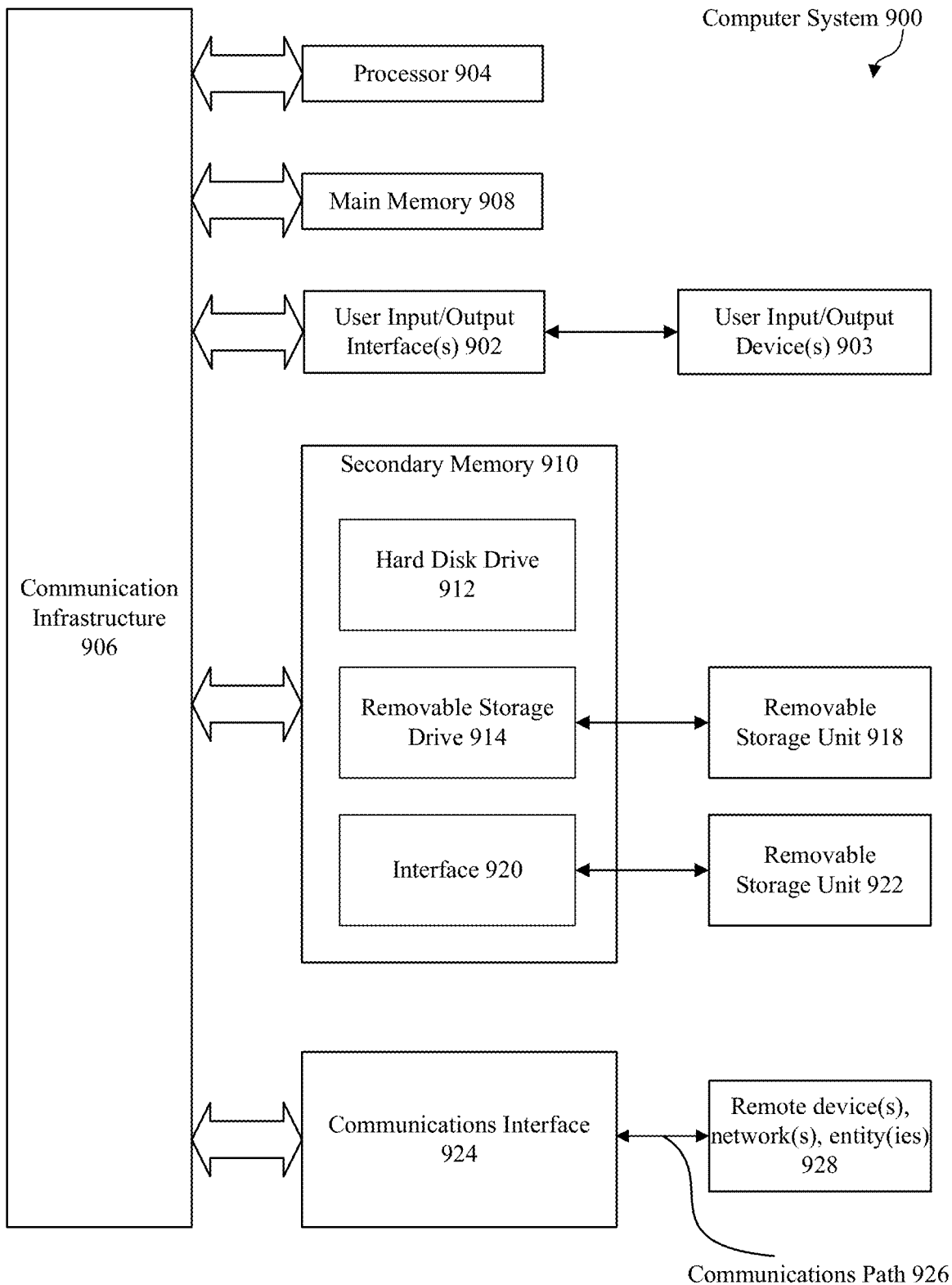
FIG. 9 illustrates an example computer system for implementing some embodiments or portion(s) thereof.

Various embodiments can be implemented, for example, using one or more computer systems, such as computer system 900 shown in FIG. 9. Computer system 900 can be any well-known computer capable of performing the functions described herein. For example, and without limitation, server 150, electronic devices such as laptops, desktops as described with regard to FIG. 1. Computer system 900 includes one or more processors (also called central processing units, or CPUs), such as a processor 904. Processor 904 is connected to a communication infrastructure or bus 906. Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device comprising:
a memory; and
one or more processors communicatively coupled to the memory and configured to:
transmit a first wake-up radio (WUR) packet in a first channel of a wideband basic service set (BSS) communication, wherein the first WUR packet comprises a first WUR beacon and an indication of a first transmission power of the first channel, wherein the first transmission power of the first channel is different than a sum transmission power of the wideband BSS communication that includes the first channel and at least one other channel;
based on a policy, transmit the indication of the first transmission power in one out of every N WUR beacons transmitted, where N is an integer greater than 1; and
transmit, substantially concurrently with the first WUR packet transmission, a second WUR packet in a duplicated WUR transmission mode in a second channel of the wideband BSS communication.

2. The electronic device of claim 1, wherein the one or more processors are further configured to:
transmit a third WUR packet in a non-duplicated WUR transmission mode in a third channel of the wideband BSS communication; and
subsequently transmit, after the third WUR packet transmission, a wireless local area network (WLAN) packet.

3. The electronic device of claim 2, wherein the third WUR packet comprises a second WUR beacon and an indication of a primary channel of a network radio of the electronic device.

4. The electronic device of claim 2, wherein the first WUR packet comprises an explicit mode indicator, and wherein prior to transmitting the third WUR packet, the one or more processors are configured to:
implicitly assign a station to the third channel based at least in part on a global unique identifier of the station.

5. The electronic device of claim 4, wherein the one or more processors are further configured to:
implicitly assign a position within the third channel to the station, wherein the third WUR packet is assigned to the position.

6. The electronic device of claim 2, wherein the first WUR packet comprises an explicit mode indicator, and wherein prior to transmitting the third WUR packet, the one or more processors are further configured to:
explicitly assign the third channel to a station.

7. The electronic device of claim 6, wherein to explicitly assign the third channel, the one or more processors are configured to:
receive, from the station, a WUR request frame indicating a preferred channel; and
transmit, to the station, a WUR response frame indicating the third channel is explicitly assigned.

8. The electronic device of claim 7, wherein the WUR request frame indicates a preferred position within the preferred channel, the one or more processors are further configured to:
determine, within the third channel, an assigned position at which the third WUR packet is located; and
transmit the assigned position in the WUR response frame.

9. The electronic device of claim 2, wherein the one or more processors are further configured to:
concurrently transmit with the third WUR packet transmission, a fourth WUR packet in the non-duplicated WUR transmission mode in the third channel of the wideband BSS communication.

10. The electronic device of claim 2, wherein the one or more processors are further configured to: assign two or more stations to the third channel of the wideband BSS communication, wherein the third WUR packet comprises a multicast message directed to the two or more stations.

11. The electronic device of claim 1, wherein the one or more processors are further configured to:
concurrently transmit with the first WUR packet transmission, a third WUR packet in a duplicated WUR transmission mode in the first channel of the wideband BSS communication.

12. A non-transitory computer-readable medium having instructions stored therein, which when executed by one or more processors in an electronic device cause the one or more processors to perform operations for receiving a wake-up radio (WUR) packet, the operations comprising:
receiving a first WUR packet comprising a first WUR beacon that comprises:
an explicit mode indicator on a first channel of a wideband basic service set (BSS) communication; and
an indication of a first transmission power of the first channel, wherein the first transmission power of the first channel is different than a sum transmission power of the wideband BSS communication that includes the first channel and at least one other channel, wherein based on a policy, the indication of the first transmission power is received in one out of every N WUR beacons received, where N is an integer greater than 1; and
determining, based at least in part on the explicit mode indicator, a second channel of the wideband BSS communication to monitor for one or more additional WUR packets;
receiving a second WUR packet on the second channel;
in response to receiving the second WUR packet, waking a main radio of the electronic device; and
receiving a wireless local area network (WLAN) packet using the main radio of the electronic device.

13. The non-transitory computer-readable medium of claim 12, wherein to determine the second channel of the wideband BSS communication to monitor, the operations comprise:
selecting the second channel of the wideband BSS communication based at least in part on a global unique identifier of the electronic device.

14. The non-transitory computer-readable medium of claim 12, wherein to determine the second channel of the wideband BSS communication to monitor, the operations comprise:
transmitting, in a WUR request frame, a preferred channel of the wideband BSS communication to monitor for one or more additional WUR packets; and receiving, in a WUR response frame, a channel index that identifies an assigned channel of the wideband BSS communication, wherein the assigned channel comprises the second channel.

15. The non-transitory computer-readable medium of claim 14, wherein the operations further comprise:
transmitting, in the WUR request frame, a preferred position within the preferred channel to monitor for one or more additional WUR packets; and
receiving, in the WUR response frame, an assigned position in the second channel.

16. The non-transitory computer-readable medium of claim 12, wherein the operations further comprise:
based at least in part on the first transmission power, estimating a distance between the electronic device and a second electronic device from which the first WUR packet is received.

17. A method for an electronic device comprising:
transmitting a first wake-up radio (WUR) packet in a first channel of a wideband basic service set (BSS) communication, wherein the first WUR packet comprises a first WUR beacon and an indication of a first transmission power of the first channel, wherein the first transmission power of the first channel is different than a sum transmission power of the wideband BSS communication that includes the first channel and at least one other channel;
based on a policy, transmitting the indication of the first transmission power in one out of every N WUR beacons transmitted, where N is an integer greater than 1; and
transmitting, substantially concurrently with the first WUR packet transmission, a second WUR packet in a non-duplicated WUR transmission mode in a second channel of the wideband BSS communication.

18. The method of claim 17, further comprising:
transmitting a third WUR packet and a fourth WUR packet in a duplicated WUR transmission mode in a third channel of the wideband BSS communication.

19. The method of claim 17, wherein, prior to transmitting the first WUR packet, the method further comprises:
assigning two or more stations to a position within the first channel, wherein the first WUR packet comprises a multicast message directed to the two or more stations.

* * * * *